United States Patent
Kwon et al.

(10) Patent No.: US 11,567,480 B2
(45) Date of Patent: Jan. 31, 2023

(54) INTEGRATED MANAGEMENT METHOD AND SYSTEM FOR HETEROGENEOUS LOGISTICS AUTOMATION EQUIPMENT

(71) Applicant: CJ LOGISTICS CORPORATION, Seoul (KR)

(72) Inventors: Do Hun Kwon, Anyang (KR); Hoi Kwon Moon, Incheon (KR); Sa Yeok Min, Seoul (KR); Byung Gyo Suh, Seoul (KR)

(*) Notice: Subject to any disclaimer, the term of this patent is extended or adjusted under 35 U.S.C. 154(b) by 0 days.

(21) Appl. No.: 17/627,924

(22) PCT Filed: Aug. 12, 2020

(86) PCT No.: PCT/KR2020/010689
§ 371 (c)(1),
(2) Date: Jan. 18, 2022

(87) PCT Pub. No.: WO2021/040281
PCT Pub. Date: Mar. 4, 2021

(65) Prior Publication Data
US 2022/0261742 A1    Aug. 18, 2022

(30) Foreign Application Priority Data
Aug. 28, 2019    (KR) .................. 10-2019-0105823

(51) Int. Cl.
*G05B 19/418*    (2006.01)
*G06Q 10/08*    (2012.01)
(Continued)

(52) U.S. Cl.
CPC ......... *G05B 19/418* (2013.01); *G05B 19/048* (2013.01); *G05B 19/4186* (2013.01); *G06Q 10/087* (2013.01); *H04L 69/26* (2013.01)

(58) Field of Classification Search
CPC ............... G05B 19/418; G05B 19/048; G05B 19/4186; G06Q 10/087; H04L 69/26
See application file for complete search history.

(56) References Cited

U.S. PATENT DOCUMENTS 6,705,523 B1    3/2004    Stamm
6,978,457 B1 *  12/2005   Johl ...................... G06F 9/4843
                                                   707/999.102
(Continued)

FOREIGN PATENT DOCUMENTS

JP        2001014008 A      1/2001
KR    1020130044828 A      5/2013
(Continued)

OTHER PUBLICATIONS

KR Office Action dated Jan. 28, 2021.
IN OA dated Aug. 25, 2022.

*Primary Examiner* — Thomas Randazzo
(74) *Attorney, Agent, or Firm* — Harvest IP Law, LLP (57) ABSTRACT

The present invention relates to an integrated management system for heterogeneous logistics automation equipment, including: an equipment standard protocol server adapted to receive commands from a plurality of warehouse management systems (WMS), to check equipment standard protocol identification (ESP ID) matching the received commands, and to produce work information in the form of telegram: a plurality of warehouse control systems (WCS) adapted to control the logistics automation equipment through the work information produced from the equipment standard protocol server; and a plurality of equipment control systems (ECS) adapted to receive the work information from the plurality of warehouse control systems (WCS) to control the logistics automation equipment.

12 Claims, 7 Drawing Sheets

(51) Int. Cl.
*H04L 67/12* (2022.01)
*G05B 19/048* (2006.01)
*H04L 69/00* (2022.01)

(56) References Cited

U.S. PATENT DOCUMENTS

| | | | |
|---|---|---|---|
| 9,866,321 B2 | 1/2018 | Oh | |
| 10,324,712 B1* | 6/2019 | Nolan | G06F 8/72 |
| 11,397,918 B1* | 7/2022 | Gilbertson | G06Q 10/0833 |
| 2007/0162435 A1* | 7/2007 | Hadari | G06Q 10/087 |
| 2014/0278621 A1* | 9/2014 | Medwin | G06Q 10/0631 |
| | | | 705/7.12 |
| 2019/0150651 A1* | 5/2019 | Pham | E06B 9/368 |
| 2021/0082220 A1* | 3/2021 | Boerger | B65G 69/2882 |
| 2021/0269244 A1* | 9/2021 | Ahmann | B65G 1/0407 |
| 2021/0309460 A1* | 10/2021 | Kim | G05D 1/0246 |

FOREIGN PATENT DOCUMENTS

| | | | |
|---|---|---|---|
| KR | 1020170019008 A | 2/2017 | |
| KR | 1020170028753 A | 3/2017 | |
| KR | 101738250 B1 * | 5/2017 | G06Q 10/087 |
| KR | 101738250 B1 | 5/2017 | |
| KR | 1020180036089 A | 4/2018 | |
| KR | 1020190056451 A | 5/2019 | |
| KR | 1020190093875 A | 8/2019 | |

\* cited by examiner

| No. | protocol ID | equipment standard protocol definition ||||| transmitting system | receiving system |
|---|---|---|---|---|---|---|---|
| | | division | protocol name | connection | description | | |
| 1 | ESP_WCS_MST_SKU | master information | product master information | DB2DB | product master information | WMS / WCS | WCS / ECS |
| 2 | ESP_WCS_INB_PLAN | inbound information | inbound schedule | DB2DB | inbound schedule order information | WMS / WCS | WCS / ECS |
| 3 | ESP_WCS_OUT_SHIPMENT_SORT_RESULT | outbound information | sorting record | DB2DB | sorting record of box of equipment for outbound plan | WMS / WCS | WCS / ECS |
| 4 | ESP_WCS_OUT_ALLOC_RT_PLAN | outbound information | calculation of the number of roll containers by customer | DB2DB | calculation result of the total number of roll containers by customer on the basis of outbound plan | WMS / WCS | WCS / ECS |
| 5 | ESP_WCS_INV_REPLENISHMENT_PLAN | inventory information | replenishing plan information | DB2DB | replenishing plan information for products to be worked on cells in equipment | WMS / WCS | WCS / ECS |
| 6 | ESP_WCS_INV_AGV_MOVE_PLAN | robot(AGV) | robot(AGV) inventory moving order | DB2DB | inventory moving order for robot equipment like transfer robot and AGV | WMS / WCS | WCS / ECS |
| 7 | ESP_WCS_OUT_WAYBILLING_PATH | Report | invoice image path record transmission | DB2DB | image path information on box section of way bill recognized in cargo recognition equipment | WMS / WCS | WCS / ECS |

FIG. 4

| division | item | Bytes | Type | Data | description |
|---|---|---|---|---|---|
| | Header Start Mark | 2 | ASCII | STX, STX | description |
| Header | Telegram ID | 2 | HEX | 01 | number between 0 to 255 is displayed with 2 bytes of hexadecimal value |
| | Group Code | 2 | HEX | 01 | number between 0 to 255 is displayed with hexadecimal value |
| | Sequence Number | 4 | HEX | FFFF | FFFF(HEX) = 65535(DEC) |
| | Body Length | 6 | HEX | FFFFFF | FFFFFF(HEX) = 16777215(DEC) byte |
| | Timespan | 6 | HEX | 1F4 | 1F4(HEX) = 500(DEC) ms |
| | Control Flag | 1 | byte | I | initial transmission=I, re-transmission=R |
| | Check Sum | 3 | char | $%T | cyclic redundancy check based on Intel (CRC, cyclic redundancy check) |
| Body | < defined according to items defined by telegram ID > | | | | |
| Body | Tail End Mark | 2 | ASCII | ETX, ETX | end of telegram |

INTEGRATED MANAGEMENT METHOD AND SYSTEM FOR HETEROGENEOUS LOGISTICS AUTOMATION EQUIPMENT

CROSS REFERENCE TO RELATED APPLICATIONS

This application is a National Stage of International Application No. PCT/KR2020/010689 filed Aug. 12, 2020, claiming priority based on Korean Patent Application No. 10-2019-0105823 filed Aug. 28, 2019.

TECHNICAL FIELD

The present invention relates to an integrated management method and system for heterogeneous logistics automation equipment, and more particularly, to an integrated management method and system for heterogeneous logistics automation equipment that is capable of efficiently integratedly managing the heterogeneous logistics automation equipment through an equipment standard protocol in a warehouse control system (WCS) installed at a logistics center.

BACKGROUND ART

Generally, a large-sized logistics center has various logistics automation equipment and warehouse management systems. Within the large-sized logistics center, all logistics automation equipment are individually managed through super systems which order works to the logistics automation equipment and manage the records of the logistics automation equipment, but because different communication systems and protocols are used according to manufacturing companies of the logistics automation equipment, it is hard to build and manage new systems in the logistics center.

For example, logistics automation is carried out through sorting equipment such as a cross belt sorter, a tilt/tray sorter, a wheel sorter, a digital assorting system (DAS), and a quick picking system (QPS), storing equipment like AS/RS, and transfer equipment such as a roller conveyor, a spiral conveyor, and a singulator, and various warehouse management systems (WMS), but if new equipment or systems are introduced in the logistics center, a lot of costs and labors are needed to allow the equipment and systems located at present in the logistics center to cooperatively operate with the new equipment or systems.

Accordingly, there is a need for development of a method and system capable of building a standardized protocol, while maintaining scalability between heterogeneous logistics automation equipment and heterogeneous super systems.

DISCLOSURE

Technical Problem

Accordingly, the present invention has been made in view of the above-mentioned problems occurring in the related art, and it is an object of the present invention to provide an integrated management method and system for heterogeneous logistics automation equipment that is capable of building an equipment standard protocol to allow equipment and systems using different formats to be managed through the standardized protocol.

It is another object of the present invention to provide an integrated management method and system for heterogeneous logistics automation equipment that is capable of defining a standardized protocol for the functions commonly needed in homogeneous equipment to provide, if new equipment or systems are built, a guideline for the design of an equipment standard protocol.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to one aspect of the present invention, there is provided an integrated management method for heterogeneous logistics automation equipment through equipment standard protocol server, including the steps of: receiving commands in the form of pseudo-code from a plurality of warehouse management systems (WMS) through an equipment standard protocol server; analyzing the received commands through the equipment standard protocol server to check equipment standard protocol identification (ESP ID) matching the analyzed commands; producing work information on the basis of the equipment standard protocol identification (ESP ID) checked by means of the equipment standard protocol server; and transmitting the produced work information to the warehouse control systems (WCS) from the equipment standard protocol server.

According to the present invention, desirably, the equipment standard protocol identification (ESP ID) includes at least one or more pieces of information of identification information of the plurality of warehouse control systems (WCS), identification information of the logistics automation equipment, master, inbound, outbound, and inventory information checkable in the plurality of warehouse control systems (WCS), transmitting and receiving information checkable in the logistics automation equipment, and functional information executable in the logistics automation equipment.

According to the present invention, desirably, the commands in the form of pseudo-code include at least one or more items of a transmitting system, a receiving system, a work item, a goods code, a quantity of goods, a goods unit, a current location of goods, and a future location of goods.

According to the present invention, desirably, the work information includes a header having a given form and a body having different forms according to the items contained in the commands.

According to the present invention, desirably, the work information is transmitted with formats adopted in the logistics automation equipment located in the plurality of warehouse control systems (WCS).

According to the present invention, desirably, the integrated management method further includes the step of, after the step of transmitting the produced work information to the plurality of warehouse control systems (WCS), monitoring work records or operating states of the plurality of logistics automation equipment to which the work information is transmitted.

To accomplish the above-mentioned objects, according to another aspect of the present invention, there is provided a computer program stored in a medium so as to execute the method according to the present invention on a computer.

To accomplish the above-mentioned objects, according to yet another aspect of the present invention, there is provided an integrated management system for heterogeneous logistics automation equipment, including: an equipment standard protocol server adapted to receive commands from a plurality of warehouse management systems (WMS), to check equipment standard protocol identification (ESP ID) matching the received commands, and to produce work information in the form of telegram: a plurality of warehouse control systems (WCS) adapted to control the logistics automation equipment through the work information produced from the equipment standard protocol server; and a plurality of equipment control systems (ECS) adapted to receive the work information from the plurality of warehouse control systems (WCS) to control the logistics automation equipment.

According to the present invention, desirably, the equipment standard protocol identification (ESP ID) includes at least one or more pieces of information of identification information of the plurality of warehouse control systems (WCS), identification information of the logistics automation equipment, master, inbound, outbound, and inventory information checkable in the plurality of warehouse control systems (WCS), transmitting and receiving information checkable in the logistics automation equipment, and functional information executable in the logistics automation equipment.

According to the present invention, desirably, the commands are in the form of pseudo-code and include at least one or more items of a transmitting system, a receiving system, a work item, a goods code, a quantity of goods, a goods unit, a current location of goods, and a future location of goods.

According to the present invention, desirably, the work information includes a header having a given form and a body having different forms according to the items contained in the commands.

According to the present invention, desirably, the warehouse control systems (WCS) transmit the work information with formats adopted in the plurality of equipment control systems (ECS) or the logistics automation equipment.

According to the present invention, desirably, each warehouse control system (WCS) includes: a master information module adapted to integrate master information managed in the logistics automation equipment; a record collection module adapted to in real time collect work records of the logistics automation equipment; and a monitoring module adapted to monitor an individual operating state of the logistics automation equipment.

According to the present invention, desirably, the equipment standard protocol server includes: a command analyzing module adapted to analyze the received commands and to detect the equipment standard protocol identification (ESP ID) matching the analyzed commands; and a telegram producing module adapted to produce the work information in the form of telegram on the basis of the equipment standard protocol identification (ESP ID).

Advantageous Effects

According to the present invention, the time and labor for building new equipment or systems can be minimized through the equipment standard protocol in the logistics center wherein various kinds of equipment and warehouse management systems are located.

In addition, the equipment standard protocol identification ID through the inbound, outbound, and inventory management functions representatively carried out in the logistics center is issued to the warehouse management systems, and accordingly, the warehouse management systems perform command and management, without any complicate connection with the logistics automation equipment or the equipment control system, so that the super systems like the warehouse management systems can maintain their scalability.

Also, the warehouse control systems make use of the work information in the form of standardized telegram in a process of transmitting the commands received from the plurality of warehouse management systems to the logistics automation equipment, and in this case, the header has the same form, while the body is being defined according to functions, thereby preventing loss of data.

The effects of the invention are not limited as mentioned above, and it should be understood that the effects of the invention include all effects inferable from the detailed description and claims of the present invention.

MODE FOR INVENTION

Hereinafter, the present invention will be in detail explained with reference to the attached drawings. Objects, characteristics and advantages of the present invention will be more clearly understood from the detailed description as will be described below and the attached drawings. In the description, the corresponding parts in the embodiments of the present invention are indicated by corresponding reference numerals.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. Terms used in this application are used to only describe specific exemplary embodiments and are not intended to restrict the present invention. An expression referencing a singular value additionally refers to a corresponding expression of the plural number, unless explicitly limited otherwise by the context.

The term 'comprising' and/or 'having', as used herein are intended to refer to the above features, numbers, steps, operations, elements, parts or combinations, and it is to be understood that the terms are not intended to preclude the presence of one or more features, numbers, steps, operations, elements, parts or combinations and added possibilities.

Figure 1:
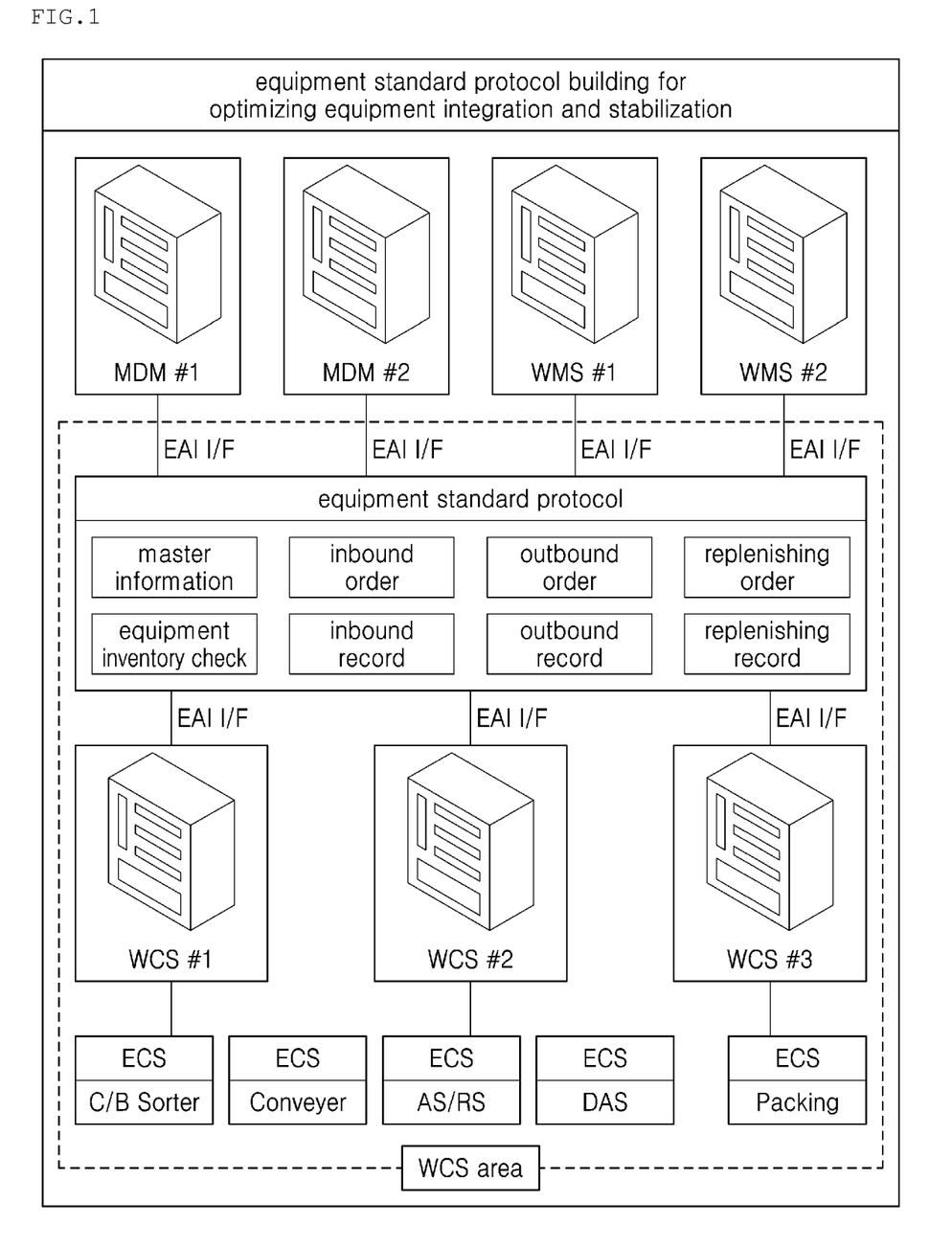
FIG. 1 is a block diagram showing a logistics environment in which an equipment standard protocol according to the present invention is built.

FIG. 1 is a block diagram showing a logistics environment in which an equipment standard protocol according to the present invention is built.

As shown in FIG. 1, a logistics environment in which an equipment standard protocol is built is divided into an area wherein warehouse control systems WCS are installed by logistics center and an area wherein warehouse management systems WMS as super systems of the warehouse control systems WCS are located to manage warehouses in which goods are stored and a plurality of systems are located to integratedly manage goods information.

The warehouse control systems WCS, various logistics automation equipment (C/B sorter, conveyor, AR/RS, DAS, packing, and so on) contained in the warehouse control systems WCS, and equipment control systems ECS for controlling the logistics automation equipment transmit and receive information related to logistics to and from the super systems through the equipment standard protocol, and the information related to logistics includes master information, inbound order, outbound order, replenishment order, equipment inventory investigation, inbound record, outbound record, replenishment record, and the like.

In a process where the supper systems and sub systems in the area having the warehouse control systems WCS transmit and receive information to and from each other, moreover, equipment standard protocol identification ESP ID defined by an equipment standard protocol server as will be discussed later can be used. A detailed explanation on the equipment standard protocol identification ESP ID will be given later.

On the other hand, the supper systems and the sub systems in the area having the warehouse control systems WCS transmit and receive information to and from each other through one equipment standard protocol, so that even if other supper systems are added, the equipment standard protocol is just used, thereby ensuring the scalability of systems.

Further, the warehouse control systems WCS transmit and receive work information on the basis of the equipment standard protocol identification ESP ID defined by the equipment standard protocol, so that when new logistics automation equipment is introduced or existing equipment is exchanged, a lot of time and cost are not needed so as to make the systems compatible with the new or exchanged equipment.

Up to now, the logistics environment in which the equipment standard protocol according to the present invention is built have been explained briefly, and now, an integrated management system 100 having the warehouse control systems WCS to which the equipment standard protocol is applied to thus ensure stability in operation will be explained.

Figure 2:
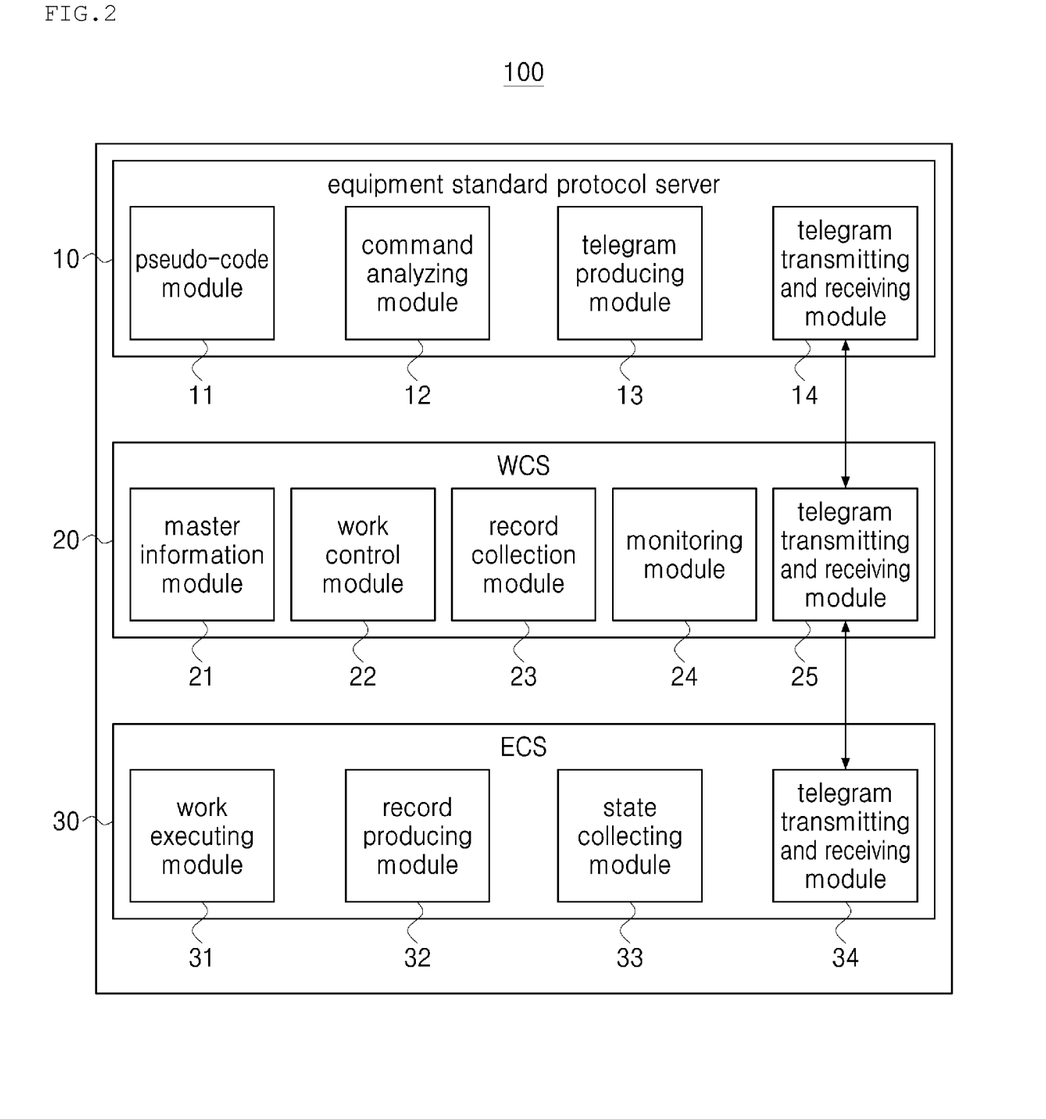
FIG. 2 is a block diagram showing a configuration of an integrated management system according to the present invention.

FIG. 2 is a block diagram showing a configuration of the integrated management system 100 according to the present invention.

As shown in FIG. 2, the integrated management system 100 according to the present invention includes an equipment standard protocol server 10, a warehouse control system WCS 20, and an equipment control system ECS 30.

The equipment standard protocol server 10 is a server that analyzes or defines the transmitted and received information between a super system like a warehouse management system WMS 40 and the warehouse control system WCS 20 installed at each logistics center on the basis of the rules of the equipment standard protocol and then converts the analyzed or defined information in accordance with the rules of the equipment standard protocol.

To do this, the equipment standard protocol server 10 includes a pseudo-code module 11, a command analyzing module 12, a telegram producing module 13, and a telegram transmitting and receiving module 14.

The pseudo-code module 11 checks commands received from the warehouse management system WMS 40, and the command analyzing module 12 analyzes the received commands and detects equipment standard protocol identification ESP ID matching the analyzed commands. In this case, the commands are order information like inbound, outbound, inventory management, and so on, and they have the form of pseudo-code. In detail, the pseudo-code module 11 and the command analyzing module 12 analyze the commands on the basis of the form previously defined.

For example, commands in the form of pseudo-code are defined as follows so that they can be more easily read.

| * Commands in the form of pseudo-code |
| --- |
| Ex1. WMS_DT1 WCS_DT pick 880123456678 120 box from A01-0101 to DS01;<br>Ex2. WMS_YJ1 WCS_YJ replenish 880123456678 120 pcs from A01-0101 to DQ01;<br>Ex3. WMS_OY1 WCS_OY putaway 880123456678 20 box from RCVSTAGE to A01-0102; |

In detail, the commands include at least one or more items of a transmitting system, a receiving system, a work item, a goods code, a quantity of goods, a goods unit, a current location of goods, and a future location of goods, and in this case, the transmitting system and the receiving system are identification ID in advance defined that is capable of dividing the super system and the sub system. The work item indicates a separator for dividing works executable in the logistics automation equipment 50, such as picking, putting away, replenishing, and moving, the goods code indicates a code for the goods registered in the master information, the quantity of goods means the quantity of goods for the work to be executed, the goods code is a unit defined on the basis of the quantity of goods (wherein a unit of box is box, and a unit of piece is pcs), a 'from location and to location' indicates a current location of goods and a location to be moved of goods (wherein one location is defined by equipment).

In detail, the equipment standard protocol server 10 receives the commands in the above-mentioned forms from the warehouse management system WMS 40, and the received commands are analyzed as concepts that can be executed or checked in the warehouse control system WCS 20 or the logistics automation equipment 50. In more detail, the commands such as inbound, outbound, inventory management, and so on can be re-analyzed as the concepts of goods storage or moving through the pseudo-code module 11 and the command analyzing module 12. After the command analyzing module 12 analyzes the commands, moreover, it can detect the equipment standard protocol identification ESP ID matching the analyzed commands. In this case, the equipment standard protocol identification ESP ID is ID issued according to sequence number ordering rules in advance defined on the basis of the works executed or checked in the logistics automation equipment 50, which is defined as follows according to kinds of information to be transmitted or received. Further, representative definition on the division items indicated in bold font is described in Table 1.

1. Master information (MST)>ESP_{Layer Name}_{Division}_{Information Name}
   Ex1. ESP_WCS_MST_SKU
2. WCS Layer connection information>ESP_{Layer Name}_{Division}_{Information Name}
   Ex2. ESP_WCS_OUT_SHIPMENT_PLAN
3. ECS Layer connection transmitting information> ESP_{Layer Name}_{Transmitting and receiving Division}_{Information Name}
   Ex3. ESP_ECS_REQ_TIME_SYNC
4. ECS Layer connection receiving information ESP_{Layer Name}_{Transmitting and receiving Division}_{Information Name}
   Ex4. ESP_ECS_ACK_TIME_SYNC

TABLE

| No. | Division | Description |
|---|---|---|
| 1 | ESP | Equipment Standard Protocol |
| 2 | MST | Master |
| 3 | INB | Inbound |
| 4 | OUT | Outbound |
| 5 | INV | Inventory |
| 6 | REQ | ECS + PLC transmission |
| 7 | ACK | One PLC + ECS reception |

Figure 3:
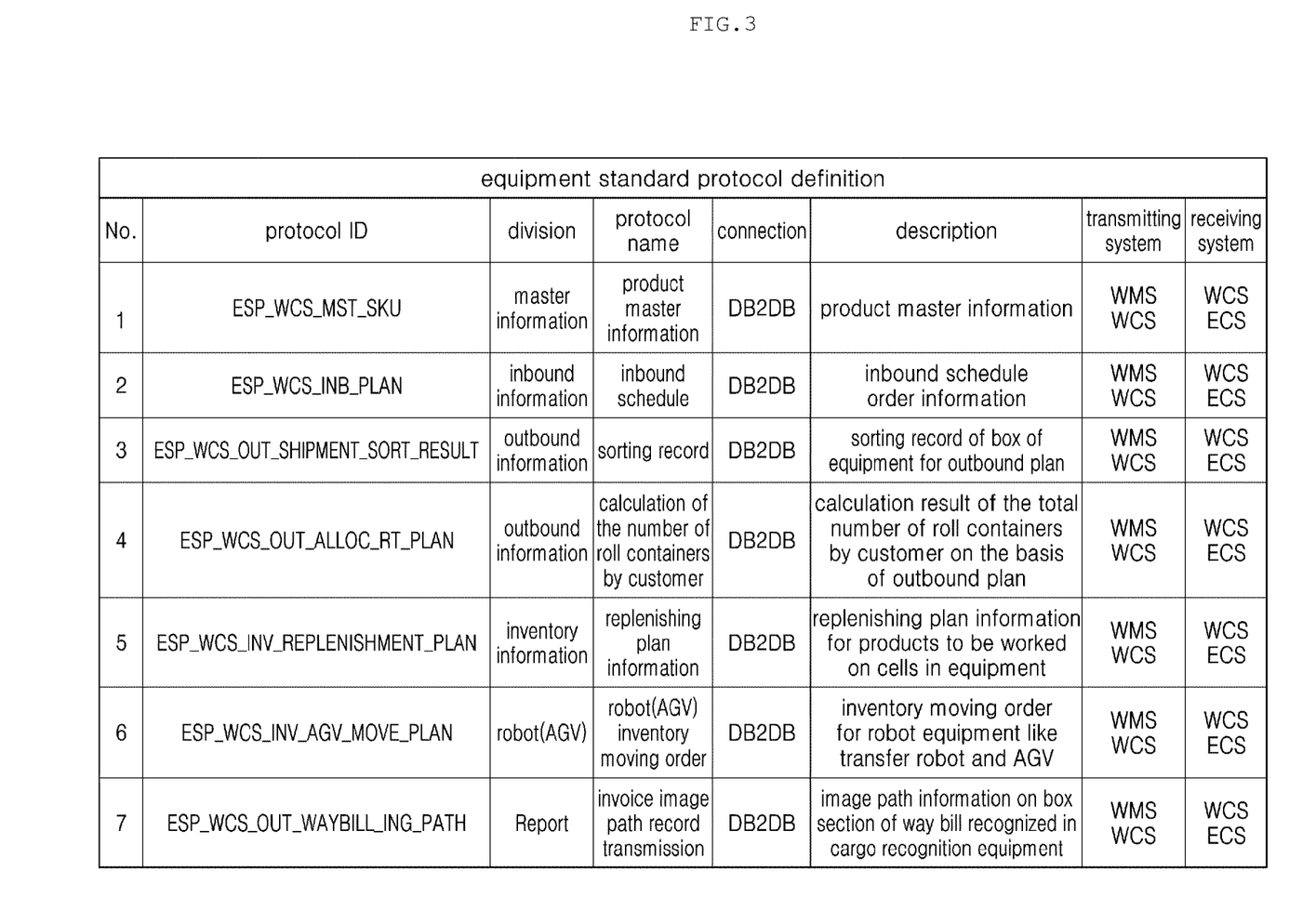
FIG. 3 is a table showing equipment standard protocol identification (ESP ID) according to the present invention.

FIG. 3 is a table showing equipment standard protocol identification ESP ID according to the present invention, and as shown, an explanation on the equipment standard protocol identification ESP ID defined under the above-mentioned rules can be given.

For example, if the equipment standard protocol identification ESP ID is 'ESP_WCS_INV_REPLENISH_PLAN', division is 'inventory', and a protocol name is 'replenishing plan'. It can be appreciated that through the equipment standard protocol identification ESP ID, the replenishing plan for goods to be worked in cell in the equipment is requested to the warehouse control system WCS 20 from the warehouse management system WMS 40.

For another example, if the equipment standard protocol identification ESP ID is 'ESP_WCS_INV_AGV_MOVE_PLAN', division is 'robot (Automated Guided Vehicle AGV)', and a protocol name is 'inventory moving of robot (AGV)'. It can be appreciated that through the equipment standard protocol identification ESP ID, the movement of inventory goods of robot equipment like a transport robot, AGV, and so on is requested to the logistics automation equipment 50 from the warehouse management system WMS 40.

Like this, the equipment standard protocol identification ESP ID includes at least one or more pieces of information of identification information of the warehouse control system WCS 20, identification information of the logistics automation equipment 50, master, inbound, outbound, and inventory information checkable in the warehouse control system WCS 20, transmitting and receiving information checkable in the logistics automation equipment 50, and functional information executable in the logistics automation equipment 50, and accordingly, the equipment standard protocol identification ESP ID can intuitively check the information that has to be executed by the warehouse control system WCS 20, the equipment control system ECS 30, or the logistics automation equipment 50.

Even if any warehouse control system WCS 20 or logistics automation equipment 50 is introduced, further, functions executed in the logistics center can be commonly defined, so that information can be efficiently transmitted and received by means of the equipment standard protocol identification ESP ID checkable through the standardized protocol.

Referring back to FIG. 2, the telegram producing module 13 of the equipment standard protocol server 10 can produce the analyzed commands as work information in the form of telegram. In this case, the work information includes a header having a given form, irrespective of kinds of work, and a body having different forms according to items contained in the commands.

Figure 4:
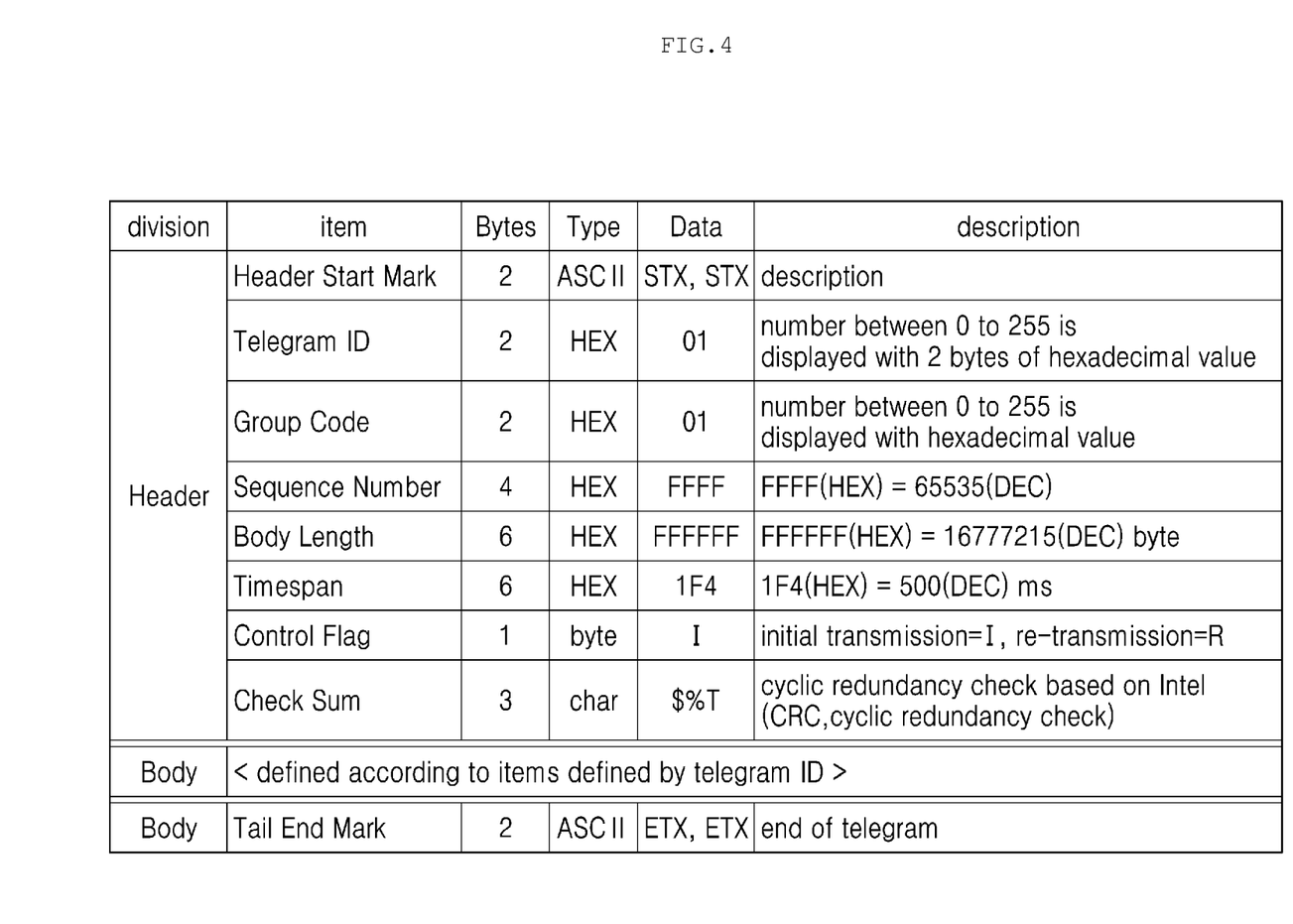
FIG. 4 is a table showing work information according to the present invention.

FIG. 4 shows the work information according to the present invention. As shown, the work information is divided into the header and the body, and the header includes telegram ID, while the body includes information corresponding to the items defined by telegram ID.

For example, if the telegram ID is 'order number', a real order number like '938925' is contained in the body, and if the telegram ID is 'equipment ID', the identification information of the logistics automation equipment 50 like 'DI01' is contained in the body. Accordingly, the commands received from the warehouse management system WMS 40 can be produced as the work information in the form of the telegram ID as indicated below.

Ex. Inbound Check
"order number": 938925
"equipment identification": DI01
"SKUID": 990991 . . .
"Quantity of work": 120EA The telegram transmitting and receiving module 14 is a module that can perform communication with the warehouse management system WMS 40 as the super system and the warehouse control system WCS 20 to transmit the work information produced in the telegram producing module 13 to the warehouse control system WCS 20. The warehouse control system WCS 20 can transmit the work information to the equipment control system ECS 30 or the logistics automation equipment 50 as the sub system in accordance with the kinds of work.

The warehouse control system WCS 20 is installed at each logistics center to manage various equipment and information in the logistics center, and in this case, the warehouse control system WCS 20 can control the various equipment through the work information produced from the equipment standard protocol server 10.

To do this, the warehouse control system WCS 20 includes a master information module 21, a work control module 22, a record collection module 23, a monitoring module 24, and a telegram transmitting and receiving module 25.

The master information module 21 integratedly manages the master information on all objects located in the logistics center, such as products (e.g., product names), and equipment (e.g., conveyors, robots, and so on), the work control module 22 controls operating information (e.g., inbound, outbound, moving) of the logistics automation equipment 50 in the logistics center, the record collection module 23 checks in real time whether the logistics automation equipment 50 in the logistics center performs the works according to the work information (for example, it checks a moving path or the number of goods moved), and the monitoring module 24 monitors an individual operating state of the logistics automation equipment 50 through cameras installed in the logistics center. Also, the telegram transmitting and receiving module 25 transmits the work information to the equipment control system ECS 30 or the logistics automation equipment 50, and in this case, the work information is transmitted with formats adopted in the logistics automation equipment 50. For example, the formats adopted in the logistics automation equipment 50 include Stream, JSON, xml, binary, hex, and so on.

The equipment control system ECS 30 receives the work information from the warehouse control system WCS 20 to control the logistics automation equipment 50, and to do this, the equipment control system ECS 30 includes a work executing module 31, a record producing module 32, a state collecting module 33, and a telegram transmitting and receiving module 34.

The work executing module 31 controls motors, conveyors, and so on of the logistics automation equipment 50 according to the work information, the record producing module 32 produces record (e.g., information on goods moved, moving path of goods, and so on) after the logistics automation equipment 50 has finished any one operation according to the work information, the state collecting module 33 produces all kinds of state information indicating a current location of the equipment if the equipment is movable in the logistics center or indicating whether equipment currently works if the equipment is fixed in the logistics center, and the telegram transmitting and receiving module 34 transmits the information produced from the work executing module 31, the record producing module 32, and the state collecting module 33 to the warehouse control system WCS 20.

Up to now, the integrated management system 100 according to the present invention has been explained. According to the present invention, the warehouse control system WCS 20 can integratedly manage the master information controlled in the respective logistics automation equipment 50 through the equipment standard protocol identification ESP ID and the work information produced on the basis of the equipment standard protocol identification ESP ID, thereby ensuring the consistency in data among the equipment.

Hereinafter, an integrated management method for the plurality of logistics automation equipment through the warehouse control system WCS 20 will be explained.

Figure 5:
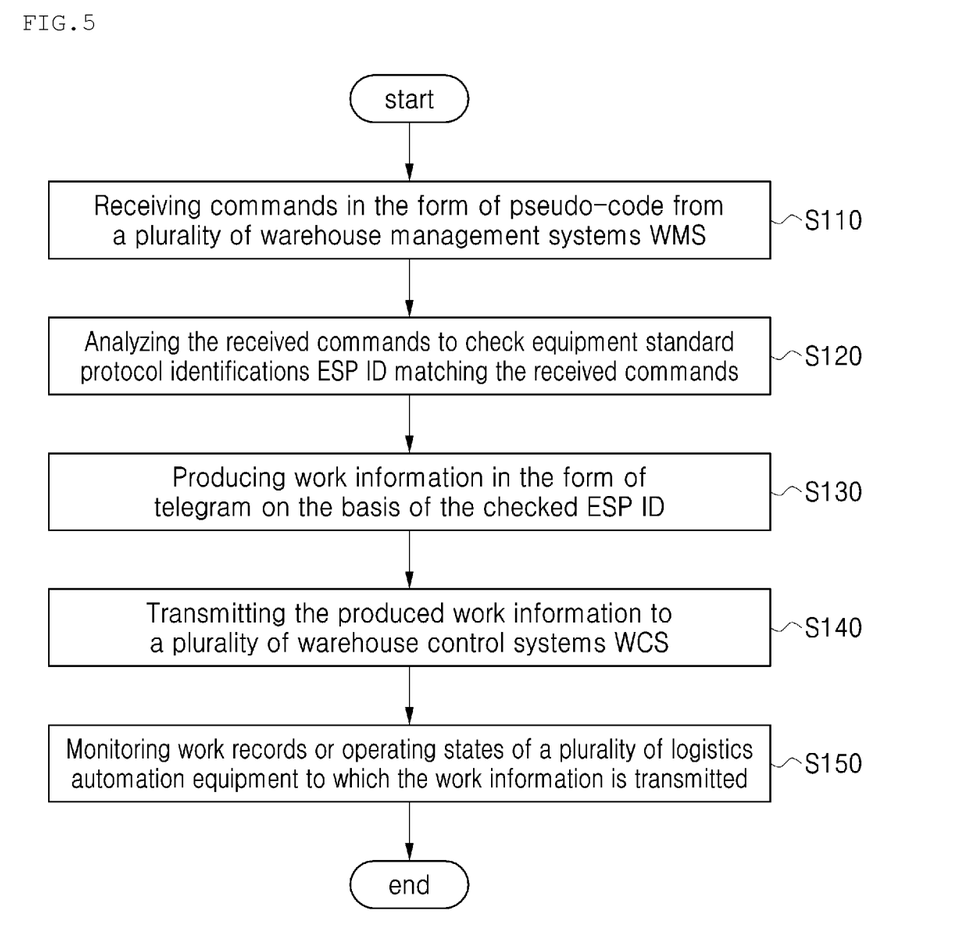
FIG. 5 is a flowchart showing an integrated management method for logistics automation equipment in a warehouse control system (WCS) to which the equipment standard protocol is applied according to the present invention.

FIG. 5 is a flowchart showing an integrated management method for logistics automation equipment through the warehouse control system WCS 20 to which the equipment standard protocol is applied according to the present invention.

Referring to FIG. 5, the equipment standard protocol server 10 receives commands in the form of pseudo-code from a plurality of warehouse management systems WMS 40 at step S110. In this case, the commands are order information related to logistics, such as inbound, outbound, inventory management, and so on, and they include at least one or more items of a transmitting system, a receiving system, a work item, a goods code, a quantity of goods, a goods unit, a current location of goods, and a future location of goods.

After the step S110, the equipment standard protocol server 10 analyzes the received commands to check the equipment standard protocol identification ESP ID matching the received commands at step S120. In this case, the equipment standard protocol identification ESP ID is ID issued according to sequence number ordering rules in advance defined on the basis of the works executed or checked in the logistics automation equipment 50, which is defined differently according to kinds of information to be transmitted or received. In detail, the equipment standard protocol identification ESP ID includes at least one or more pieces of information of identification information of the warehouse control system WCS 20, identification information of the logistics automation equipment 50, master, inbound, outbound, and inventory information checkable in the warehouse control system WCS 20, transmitting and receiving information checkable in the logistics automation equipment 50, and functional information executable in the logistics automation equipment 50. For example, if the equipment standard protocol identification ESP ID is 'ESP_WCS_INV_DISCHARGE_CONFIRM', division is 'inventory', and a protocol name is 'inventory discharge confirmation'. It can be appreciated that through the equipment standard protocol identification ESP ID, the record for the inventory discharge plan information is requested to the warehouse control system WCS 20 from the warehouse management system WMS 40.

After the step S120, the equipment standard protocol server 10 produces the work information in the form of telegram on the basis of the checked equipment standard protocol identification ESP ID at step S130. In detail, the equipment standard protocol server 10 produces the work information in another form on the basis of the equipment standard protocol identification ESP ID re-analyzed as a concept capable of being executed or checked by the warehouse control system WCS 20 or the logistics automation equipment 50.

Also, the work information in the form of telegram includes a header having telegram ID and a body having information corresponding to the items defined according to the telegram ID. For example, if the telegram ID is 'order number', a real order number like '938925' is contained in the body, and if the telegram ID is 'equipment identification', the identification information of the logistics automation equipment 50 like 'DI01' is contained in the body. Accordingly, the commands received from the warehouse management system WMS 40 can be produced as the work information in the form of telegram as indicated below.

Ex. Inbound Check
"order number": 938925
"equipment identification": DI01
"SKUID": 990991.
"Quantity of work": 120EA After the step S130, the equipment standard protocol server 10 transmits the produced work information to the warehouse control system WCS 20 at step S140, and next, the equipment standard protocol server 10 monitors work records or operating states of the logistics automation equipment 50 to which the work information is transmitted at step S150. For example, if the work information as 'outbound order' information is transmitted to the warehouse control system WCS 20, the equipment standard protocol server 10 monitors the operating state of the logistics automation equipment 50 performing the outbound order through monitoring cameras (e.g., CCTV) installed in the logistics center and handles computerized information related to the outbound order as will be described below.

Figure 6:
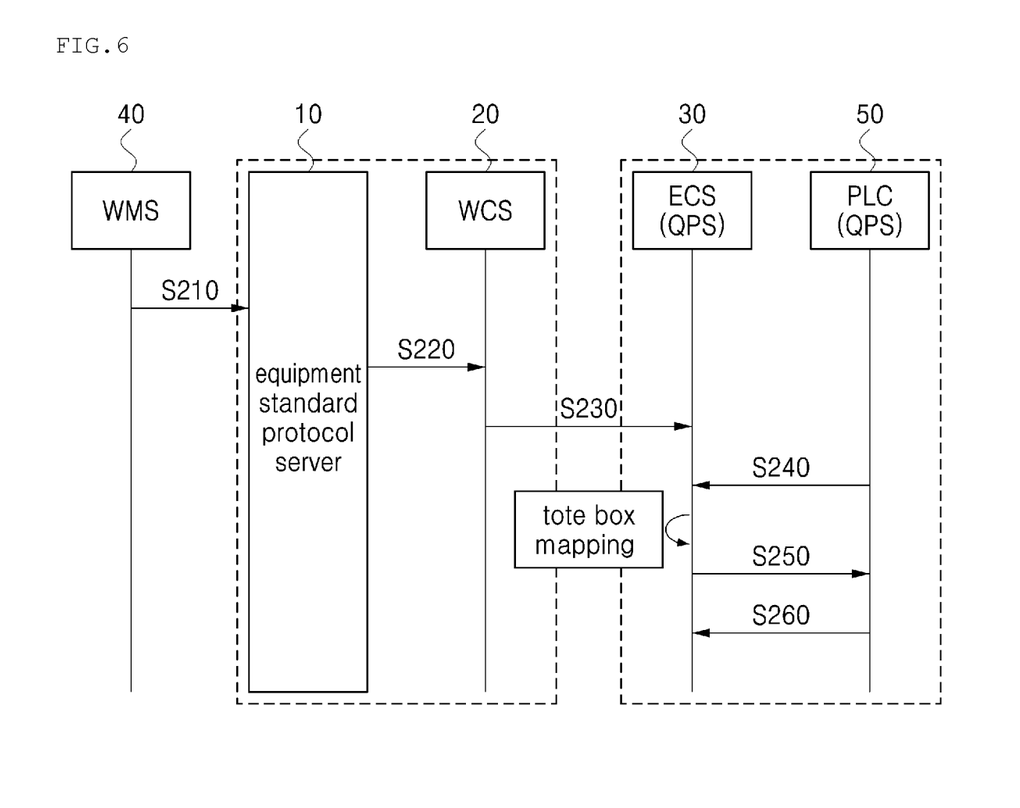
FIG. 6 is a flowchart showing a method for ordering outbound work to QPS as logistics automation equipment from the warehouse control system (WCS) to which the equipment standard protocol is applied according to the present invention.

FIG. 6 is a flowchart showing a method for ordering outbound work to QPS as logistics automation equipment in the warehouse control system WCS 20 to which the equipment standard protocol is applied according to the present invention.

Referring to FIG. 6, it can be appreciated that steps S210 to S230 are the same as the steps S110 to S140 of FIG. 5. At the steps S210 to S230, the equipment standard protocol server 10 maps the equipment standard protocol identification ESP ID having the protocol name 'outbound order' and then produces order information corresponding to the equipment standard protocol identification ESP ID, and the warehouse control system WCS 20 transmits the produced order information to the equipment control system ECS 30.

The equipment control system ECS 30 controls QPS of the logistics automation equipment 50 according to the order information and requests the control result to a programmable logic device PLC connected to the logistics automation equipment 50 at step S240. For example, the information transmitted and received in FIG. 6 is information on 'outbound order' of any goods, and accordingly, the equipment standard protocol server 10 can perform mapping request (QPS route inquiry) for a tote box where the goods are put to the programmable logic controller PLC connected to the logistics automation equipment 50. In this case, the mapping request may be a request for checking whether the goods to which outbound order is issued exist in the logistics center.

After the step S240, the equipment control system ECS 30 receives a tote box matching result from the programmable logic controller PLC connected to the logistics automation equipment 50 at step S250. In this case, the protocol name, which receives the matching result, is "QPS Route Inquiry Ack".

After the step S250, the equipment control system ECS 30 receives information on arrival of the tote box in which the goods is put from the logistics automation equipment 50 performing a goods moving function to make the goods outbound at step S260. In this case, the protocol name, which receives the arrival information, is "Report of Tote Box Arrival at Picking Zone", and then, the arrival information is transmitted to the warehouse control system WCS 20.

Up to now, the integrated management method for the logistics automation equipment 50 through the warehouse control system WCS 20 according to the present invention has been explained. According to the present invention, the equipment standard protocol is used in integratedly managing the plurality of the logistics automation equipment 50 having different formats from each other, so that time required to manage the equipment and systems in the conventional practices can be saved.

Hereinafter, an explanation on a logistics system management environment more simplified through the application of the equipment standard protocol according to the present invention will be given.

Figure 7:
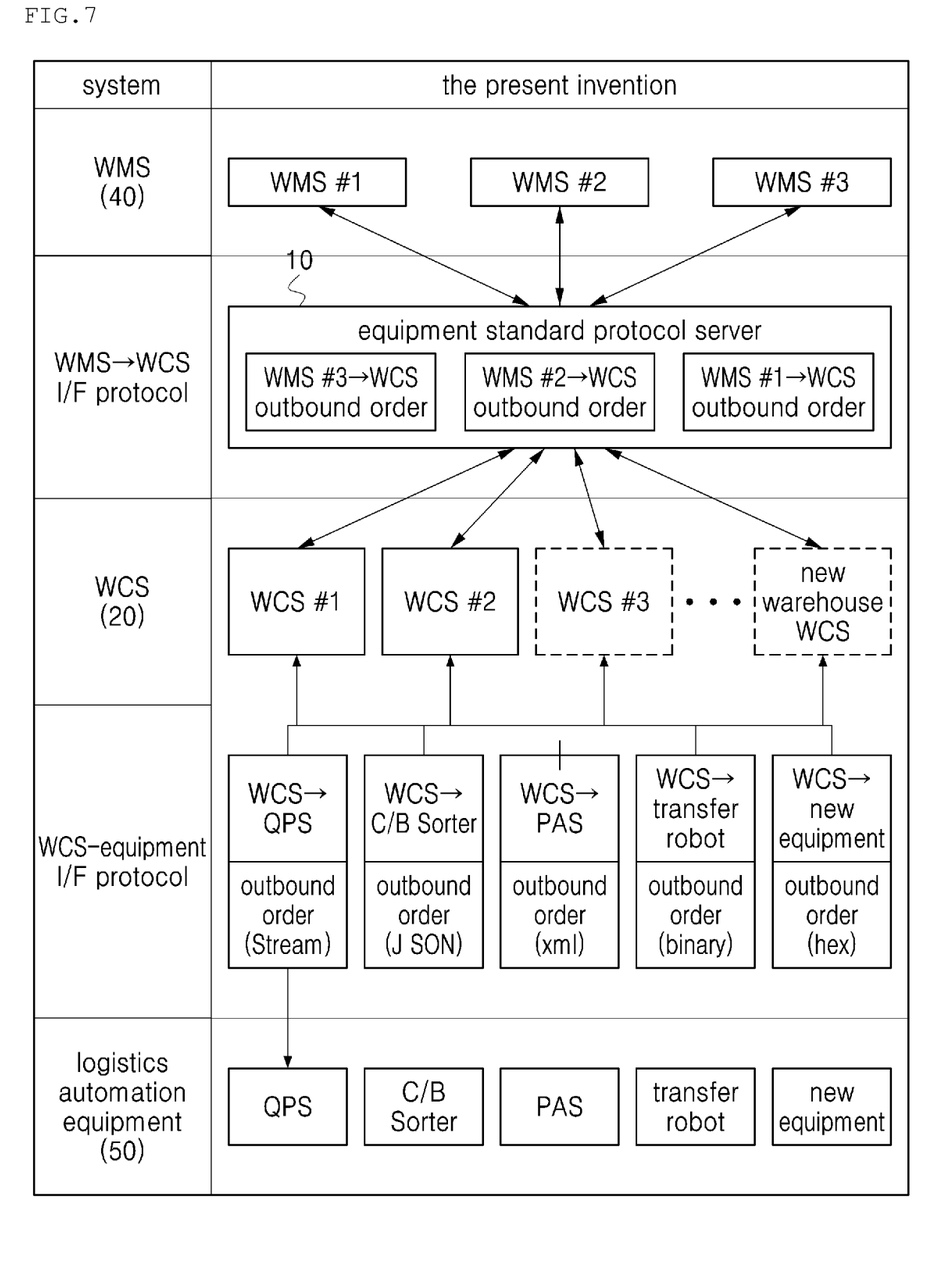
FIG. 7 shows communication relations among systems after an equipment standard protocol server according to the present invention has been adopted.

FIG. 7 shows communication relations among systems after the equipment standard protocol server 10 according to the present invention has been adopted.

Referring to FIG. 7, the plurality of warehouse management systems WMS 40 transmits and receives information to and from the plurality of warehouse control systems WCS 20 through one equipment standard protocol server 10, while being not connected one by one with the plurality of warehouse control systems WCS 20. In detail, a standardized system can be built among the plurality of equipment and systems in the logistics center on the basis of one protocol.

Accordingly, the warehouse control systems WCS 20 can be more easily distributed, and even if new logistics automation equipment 50 is located in the warehouse control systems WCS 20 to which the standard protocol is applied, there is no need to change the existing set system, thereby minimizing the time and labor for building a new system.

Meanwhile, the present invention as described above may be executed in the form of codes read by a computer in computer readable recording media. The computer readable recording media may include various storage media such as storage media, optical recording media, and so on. Also, it is possible to record data format of messages used in the present invention in the recording media.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. An integrated management method for heterogeneous logistics automation equipment through equipment standard protocol server, comprising the steps of:
receiving commands in the form of pseudo-code from a plurality of warehouse management systems (WMS);
analyzing the received commands to check equipment standard protocol identification (ESP ID) matching the analyzed commands;
producing work information on the basis of the equipment standard protocol identification (ESP ID); and
transmitting the produced work information to a plurality of warehouse control systems (WCS),
wherein the equipment standard protocol identification (ESP ID) comprises at least one or more pieces of information of identification information of the plurality of warehouse control systems (WCS), identification information of the logistics automation equipment, master, inbound, outbound, and inventory information checkable in the plurality of warehouse control systems (WCS), transmitting and receiving information checkable in the logistics automation equipment, and functional information executable in the logistics automation equipment.

2. The integrated management method according to claim 1, wherein the commands in the form of pseudo-code comprise at least one or more items of a transmitting system, a receiving system, a work item, a goods code, a quantity of goods, a goods unit, a current location of goods, and a future location of goods.

3. The integrated management method according to claim 1, wherein the work information comprises a header having a given form and a body having different forms according to the items contained in the commands.

4. The integrated management method according to claim 1, wherein the work information is transmitted with formats adopted in the logistics automation equipment located in the plurality of warehouse control systems (WCS).

5. The integrated management method according to claim 1, further comprising the step of, after the step of transmitting the produced work information to the plurality of warehouse control systems (WCS), monitoring work records or operating states of the plurality of logistics automation equipment to which the work information is transmitted.

6. An integrated management system for heterogeneous logistics automation equipment, comprising:
an equipment standard protocol server adapted to receive commands from a plurality of warehouse management systems (WMS), to check equipment standard protocol identification (ESP ID) matching the received commands, and to produce work information in the form of telegram:

a plurality of warehouse control systems (WCS) adapted to control the logistics automation equipment through the work information produced from the equipment standard protocol server; and a plurality of equipment control systems (ECS) adapted to receive the work information from the plurality of warehouse control systems (WCS) to control the logistics automation equipment, wherein the equipment standard protocol identification (ESP ID) comprises at least one or more pieces of information of identification information of the plurality of warehouse control systems (WCS), identification information of the logistics automation equipment, master, inbound, outbound, and inventory information checkable in the plurality of warehouse control systems (WCS), transmitting and receiving information checkable in the logistics automation equipment, and functional information executable in the logistics automation equipment.

7. The integrated management system according to claim 6, wherein the commands are in the form of pseudo-code and comprise at least one or more items of a transmitting system, a receiving system, a work item, a goods code, a quantity of goods, a goods unit, a current location of goods, and a future location of goods.

8. The integrated management system according to claim 6, wherein the work information comprises a header having a given form and a body having different forms according to the items contained in the commands.

9. The integrated management system according to claim 6, wherein the warehouse control systems (WCS) transmit the work information with formats adopted in the plurality of equipment control systems (ECS) or the logistics automation equipment.

10. The integrated management system according to claim 6, wherein each warehouse control system (WCS) comprises:

a master information module adapted to integrate master information managed in the logistics automation equipment;

a record collection module adapted to in real time collect work records of the logistics automation equipment; and a monitoring module adapted to monitor an individual operating state of the logistics automation equipment.

11. The integrated management system according to claim 6, wherein the equipment standard protocol server comprises:

a command analyzing module adapted to analyze the received commands and to detect the equipment standard protocol identification (ESP ID) matching the analyzed commands; and a telegram producing module adapted to produce the work information in the form of telegram on the basis of the equipment standard protocol identification (ESP ID).

12. A non-transitory computer readable medium storing a program causing a computer to execute a method for heterogeneous logistics automation equipment through equipment standard protocol server, the method comprising:

receiving commands in the form of pseudo-code from a plurality of warehouse management systems (WMS);

analyzing the received commands to check equipment standard protocol identification (ESP ID) matching the analyzed commands;

producing work information on the basis of the equipment standard protocol identification (ESP ID); and transmitting the produced work information to a plurality of warehouse control systems (WCS), wherein the equipment standard protocol identification (ESP ID) comprises at least one or more pieces of information of identification information of the plurality of warehouse control systems (WCS), identification information of the logistics automation equipment, master, inbound, outbound, and inventory information checkable in the plurality of warehouse control systems (WCS), transmitting and receiving information checkable in the logistics automation equipment, and functional information executable in the logistics automation equipment.

\* \* \* \* \*